April 1, 1924.
R. J. ALTGELT
1,489,053
HITCH MEANS FOR WHEELED PLOWS
Filed July 13, 1920
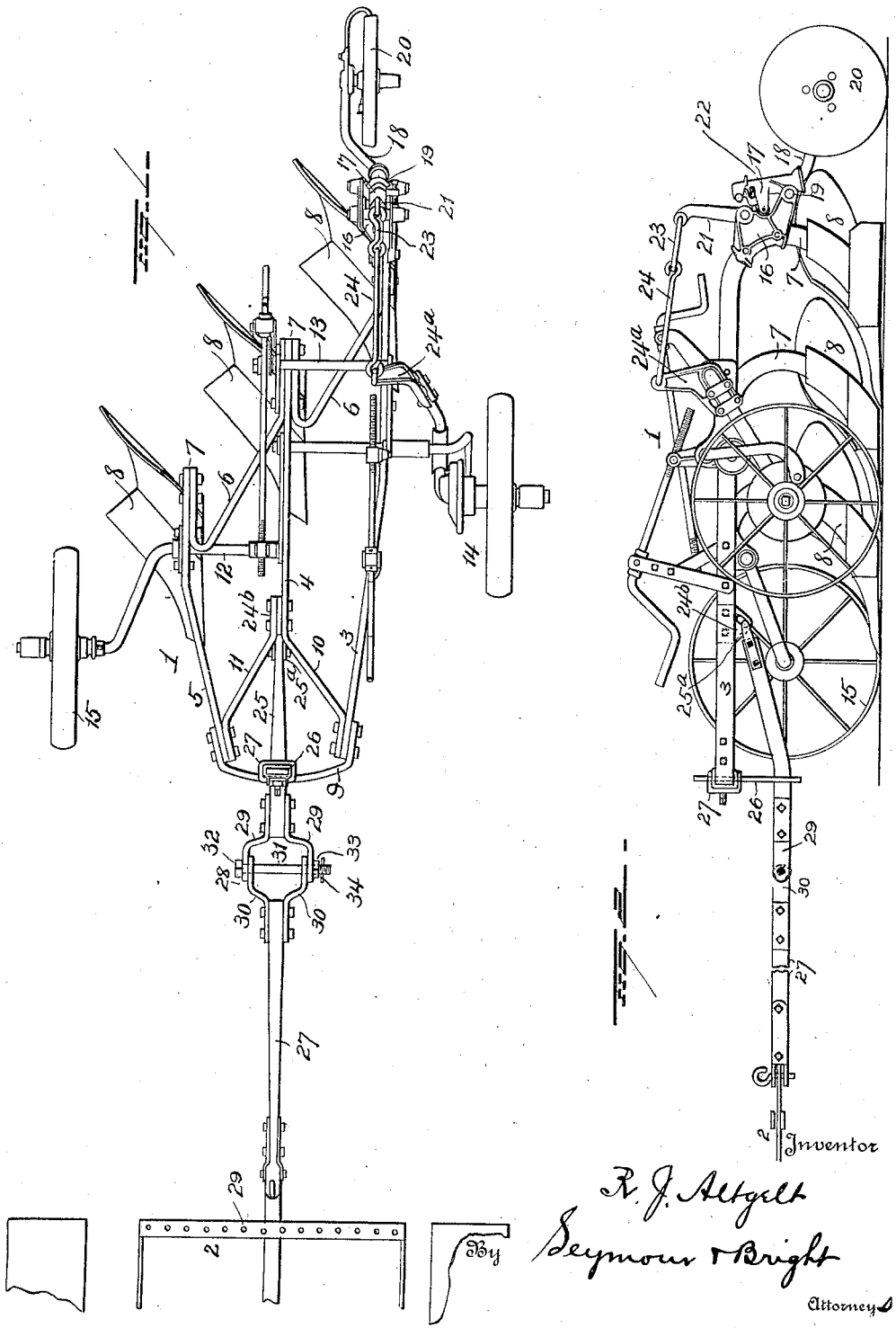
Inventor
R. J. Altgelt
By Seymour & Bright
Attorneys Patented Apr. 1, 1924.

1,489,053

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

HITCH MEANS FOR WHEELED PLOWS.

Application filed July 13, 1920. Serial No. 395,870.

*To all whom it may concern:*

Be it known that I, RUDOLPH J. ALTGELT, a citizen of the United States, and a resident of South Bend, in the county of St. Joseph and State of Indiana, have invented certain new and useful Improvements in Hitch Means for Wheeled Plows; and I do hereby declare the following to be a full, clear, and exact description of the invention, such as will enable others skilled in the art to which it appertains to make and use the same.

This invention relates to hitch means for wheeled plows, and more particularly to means for connecting a three-wheeled plow with a tractor,—the object of the invention being to provide simple and efficient devices for connecting a three-wheeled plow with a tractor in such manner that the plow bases may run at uniform depth irrespective of the irregular up-and-down movements of the tractor in traveling over rough or uneven ground.

With this and other objects in view, the invention consists in certain novel features of construction and combinations of parts as hereinafter set forth and pointed out in the claim.

In the accompanying drawings; Figure 1 is a plan view illustrating my invention, and Figure 2 is a side elevation.

1 represents a plow structure and 2 a tractor with which it is connected.

In the plow construction shown in the drawing, the same may comprise three beams 3, 4, 5 having their rear portions connected by diagonal braces 6 and having standards 7 at their rear ends to receive plow bases 8. The forward ends of the side beams 3 and 5 are connected by a cross bar or rail 9 and the forward end of the central beam 4 is bent laterally and forwardly to form a diagonal forward brace 10, secured at its forward end to the side beam 3, while a separate forward diagonal brace 11 connects the forward end of the side beam 5 with the central beam 4. The side beams, braces and forward cross bar thus constitute a plow frame.

Crank axles 12—13 are mounted in suitable bearings on the frame beams and their spindle portions are mounted in the hubs of side carrying wheels, 14—15. A bracket 16 is secured to the rear plow standard and to this bracket a bearing member 17 for the standard portion of an axle 18 is pivoted at 19,—the spindle of said axle being mounted in the hub of a rear or follower wheel 20. A lever 21 may be pivoted to the bracket 16 and adapted to cooperate with an arm 22 on the bearing member 17,—the upper end of said lever being connected by a link 23 and a rod 24 with an arm 24ª on the crank axle 13.

At or near the juncture of the forward braces 10—11 with the central beam 4, a depending bracket 24ᵇ is secured. To this bracket, the rear end of a draw-bar member 25 is loosely connected by means of a loop 25ª. This draw-bar member is supported below the forward cross bar or rail 9, by means of a vertical bar or upright 26, the latter being adjustably secured to the forward cross bar or rail of the frame by means of clamping devices indicated at 27,— said clamping devices being adjustable on said forward cross rail so that the draw-bar member may be adjusted laterally. The adjustable connections of the draw-bar member with the forward end of the frame will permit a forward draw-bar member 27 connected with the member 25 to be adjusted for connection with different makes of tractor.

The forward end of the forward draw-bar member 27 is connected, through the medium of coupling devices indicated at 28ª, with the hitch bar 29 of the tractor 2.

The connection between the two draw-bar members 25 and 27 is flexible so that the uneven up-and-down motion of the tractor in travelling over rough or uneven ground will not be transmitted to the wheeled plow structure and thus the depth of penetration of the plow bases will be kept uniform regardless of the varied motions to which the tractor may be subjected by reason of the unevenness of the ground.

In effecting the flexible connection between the two draw-bar members, I secure to the forward end of the member 25 which projects beyond the front cross bar or rail of the frame, two arms 29—29, the forwardly projecting portions of which are spread laterally, respectively in opposite directions. Similar spread arms 30 are secured to the draw-bar member 27 and project rearwardly therefrom. The free end portions of the arms 29 lie parallel with the free end portions of the arms 30, and all of said arms are provided with perforations which align and receive a horizontal pivot rod or bolt 31 whereby the two draw-bar members are pivotally connected together. One end of the rod or bolt may be provided with a head 32 and the other end may be threaded to receive a nut 33. The threaded portion of the rod or bolt may be perforated to receive a cotter pin 34 to prevent escape of the nut 33.

Having fully described my invention what I claim as new and desire to secure by Letters Patent, is:—

The combination with an implement frame, and side and rear supporting wheels, of two draw-bar members adapted for connection, respectively with the implement frame and a tractor, a pair of horizontal arms secured to the forward end of one draw-bar member and projecting forwardly beyond the same, a similar pair of horizontal arms secured to the other draw-bar member and projecting rearwardly from the same, the arms of one pair having parts disposed parallel with parts of the arms of the other pair, and a horizontal pivot member passing through the arms of both pairs, whereby the draw-bar members are flexibly connected and susceptible of free and unobstructed vertical play and prevented from lateral relative movement.

In testimony whereof, I have signed this specification in the presence of two subscribing witnesses.

RUDOLPH J. ALTGELT.

Witnesses:
 ROSE B. MARBAUGH,
 T. C. CLINTON.